United States Patent
Zhu et al.

(10) Patent No.: US 12,548,631 B2
(45) Date of Patent: Feb. 10, 2026

(54) CROSSBAR CIRCUITS INCLUDING RRAM DEVICES WITH MINIMIZED WRITE DISTURBANCES

(71) Applicant: TetraMem Inc., Fremont, CA (US)

(72) Inventors: Hengfang Zhu, Fremont, CA (US); Ning Ge, Danville, CA (US)

(73) Assignee: TetraMem Inc., San Jose, CA (US)

( * ) Notice: Subject to any disclaimer, the term of this patent is extended or adjusted under 35 U.S.C. 154(b) by 98 days.

(21) Appl. No.: 18/429,313

(22) Filed: Jan. 31, 2024

(65) Prior Publication Data

US 2025/0246255 A1 Jul. 31, 2025

(51) Int. Cl.
*G11C 27/00* (2006.01)

(52) U.S. Cl.
CPC .................... *G11C 27/005* (2013.01)

(58) Field of Classification Search
CPC .................................... G11C 27/005
USPC .......................................... 365/45
See application file for complete search history.

(56) References Cited

U.S. PATENT DOCUMENTS

2005/0007823 A1* 1/2005 Smith ............... G11C 11/15
365/185.17

* cited by examiner

Primary Examiner — Fernando Hidalgo
(74) Attorney, Agent, or Firm — Jaffery Watson Hamilton & DeSanctis LLP

(57) ABSTRACT

The present disclosure provides for crossbar circuits with minimized write disturbance. A crossbar circuit may include a plurality of bit lines intersecting with a plurality of word lines, a plurality of select lines, a plurality of cross-point devices, and a ramp-rate adjustable DAC that comprises a control circuit and an operational amplifier. An input of the operational amplifier is connected to a capacitor. The control circuit may generate, based on a digital input, a control signal. To program a cross-point device of the crossbar circuit, the capacitor may be charged using a reference current. As the charging rate of the capacitor is limited by the reference current, and the charging duration is controlled by the control signal, thus the output of the operational amplifier corresponds to the digital input and may be applied to the cross-point device as a programming signal with limited slew-rate adjustable by the reference current.

19 Claims, 10 Drawing Sheets

CROSSBAR CIRCUITS INCLUDING RRAM DEVICES WITH MINIMIZED WRITE DISTURBANCES

TECHNICAL FIELD

The implementations of the disclosure relate generally to electronic devices and, more specifically, to crossbar circuits including resistive random-access memory (RRAM or ReRAM) devices and schemes for minimizing write disturbances for the crossbar circuits.

BACKGROUND

A crossbar circuit may refer to a circuit structure with interconnecting electrically conductive lines sandwiching a memory element, such as a resistive switching material, at their intersections. The resistive switching material may include, for example, a memristor (also referred to as resistive random-access memory (RRAM or ReRAM)). Crossbar circuits may be used to implement in-memory computing applications, non-volatile solid-state memory, image processing applications, neural networks, etc.

SUMMARY

The following is a simplified summary of the disclosure to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

According to one or more aspects of the present disclosure, an apparatus is provided. The apparatus includes a plurality of bit lines intersecting with a plurality of word lines; a plurality of cross-point devices; a capacitor configured to be connected to a reference via a first switch; and an operational amplifier. Each of the plurality of cross-point devices is connected to at least one of the plurality of word lines, at least one of the plurality of bit lines, and a select line. A first input of the operational amplifier is connected to the capacitor. An output of the operational amplifier is operatively connected to one or more of the word lines or bit lines via one or more switches.

In some embodiments, the apparatus further includes a control circuit configured to generate a control signal based on a digital input, wherein the first switch is switched on or off based on the control signal.

In some embodiments, the control signal includes a pulse-width modulated signal generated based on the digital input.

In some embodiments, the capacitor is configured to be discharged via a second switch.

In some embodiments, the plurality of cross-point devices includes at least one of a memristor, a phase-change memory (PCM) device, a floating gate device, a spintronic device, a ferroelectric device, or a resistive random-access memory (RRAM) device.

In some embodiments, the operational amplifier includes a unity gain amplifier.

In some embodiments, a second input of the operational amplifier is grounded.

In some embodiments, the apparatus further includes a plurality of select lines.

In some embodiments, the plurality of select lines are parallel to the plurality of bit lines.

In some embodiments, the plurality of select lines are parallel to the plurality of word lines.

In some embodiments, a second input of the operational amplifier is connected to the output of the operational amplifier.

According to one or more aspects of the present disclosure, methods for programming a crossbar circuit are provided. The methods include: generating, based on a digital input, a control signal; and charging a capacitor to a voltage corresponding to a programming voltage to be applied to a first cross-point device of the crossbar circuit. The crossbar circuit includes a plurality of word lines intersecting with a plurality of bit lines and a plurality of cross-point devices. The capacitor is connected to a first input of an operational amplifier. An output of the operational amplifier is connected to at least one of a first word line or a first bit line connected to the first cross-point device. The charging of the capacitor is controlled by the control signal.

In some embodiments, the control signal includes a pulse-width modulated signal.

In some embodiments, charging the capacitor includes connecting a first plate of the capacitor to a first reference via a first switch, wherein the first plate of the capacitor is connected to the first input of the operational amplifier.

In some embodiments, the first switch is on or off based on the control signal.

In some embodiments, discharging the capacitor after programming the first cross-point device by grounding the first plate of the capacitor via a second switch.

In some embodiments, a second input of the operational amplifier is connected to the output of the operational amplifier.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding.

DETAILED DESCRIPTION

Figure 1:
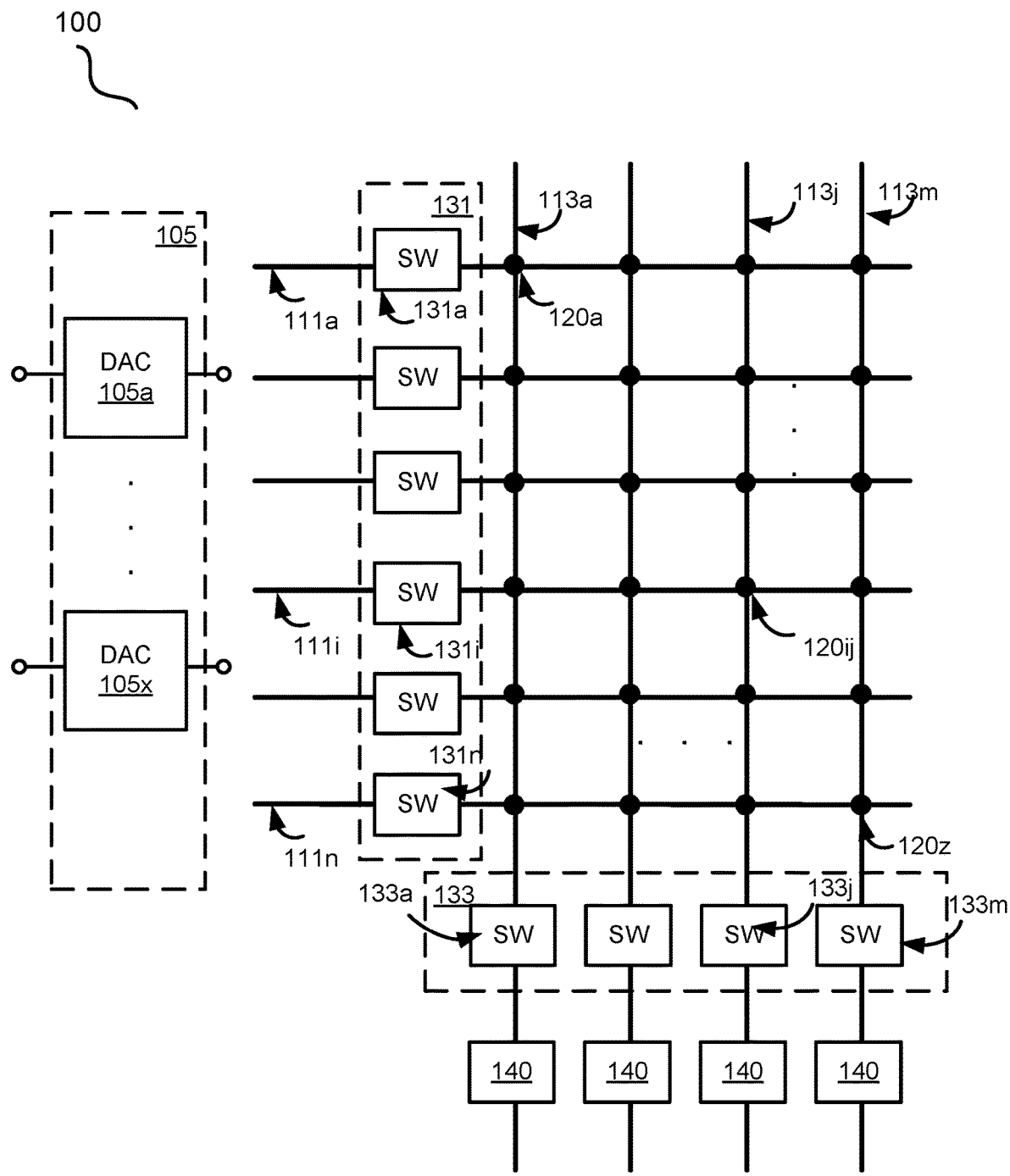
FIG. 1 is a diagram illustrating an example of a crossbar circuit in accordance with some embodiments of the present disclosure.

Aspects of the disclosure provide crossbar circuits with minimized write disturbances. A crossbar circuit may include intersecting electrically conductive wires (e.g., row lines, column lines, etc.) and cross-point devices arranged in one or more arrays. Each of the cross-point devices may be connected to a word line, a bit line, and a select line. The cross-point devices may include, for example, a phase-change memory (PCM) device, a floating gate device, a spintronic device, a ferroelectric device, a resistive random-access memory (RRAM) device, etc.

Write disturbances may occur in a crossbar circuit when the programming of a selected cross-point device inadvertently affects the resistance state of another unselected cross-point device. After achieving and maintaining the target conductance within an acceptable limit for several cycles in certain RRAM devices in the crossbar circuit, unexpected conductance shifts can occur due to the programming of other memristors in the same array. Such disturbance of the originally programmed RRAM devices may necessitate a restart of a programming process, consequently extending the overall programming time required to program the crossbar circuit. In some cases, it may be impossible to program each of the RRAM devices in the array to its target conductance, thereby undermining the overall efficiency and functionality of the crossbar circuit. The write disturbance is primarily caused by the parasitic capacitance of the crossbar circuit. The parasitic capacitance can affect the voltage difference across RRAM devices that are not selected for programming, causing these unselected RRAM devices to change their resistance state unintentionally.

The present disclosure provides mechanisms for minimizing write disturbance in crossbar circuits. In accordance with one or more aspects of the present disclosure, a crossbar circuit may include a plurality of bit lines intersecting with a plurality of word lines and a plurality of cross-point devices. Each of the cross-point devices is connected to a word line and a bit line. The crossbar circuit further includes a control circuit and an operational amplifier. The output of the operational amplifier may be selectively connected to one or more word lines and/or bit lines for applying programming voltages on the word lines and/or bit lines. An input (e.g., the positive input) of the operational amplifier is connected to a capacitor. To program a cross-point device of the crossbar circuit, the output of the operational amplifier may be provided to a select line, a word line and/or a bit line connected to the cross-point device. The capacitor may be charged with a reference voltage. The charging of the capacitor may be controlled by a control signal generated by the control circuit. For example, the capacitor is charged when the control signal is in a high state. The capacitor is not charged when the control signal is in a low state. In some embodiments, the control signal is a pulse-width modulated signal generated based on a digital input. The output of the operational amplifier may be applied to the cross-point device as a programming signal (e.g., a programming voltage) via the select line, the word line and/or the bit line connected to the cross-point device. After the programming of the cross-point device, the capacitor may be discharged.

Generating the programming signal utilizing the charging of the capacitor may slow down the voltage changes on the select line, bit line and the word line connected to the cross-point device to be programmed, thereby allowing the voltage on the parasitic capacitors to synchronize with the select line, bit line and word line voltage alterations. As a result, the voltage difference across the unselected RRAM devices may be maintained at a sufficiently low level to prevent unintentional programming of unselected RRAM devices.

FIG. 1 is a diagram illustrating an example 100 of a crossbar circuit in accordance with some embodiments of the present disclosure. As shown, crossbar circuit 100 may include a plurality of interconnecting electrically conductive wires, such as row line 111a, . . . , 111i, . . . , 111n, and column lines 113a, . . . , 113j, . . . , 113m for an n-row by m-column crossbar array. The crossbar circuit 100 may further include cross-point devices 120a, . . . , 120ij, . . . , 120z, etc. Each of the cross-point devices may connect a word line and a bit line. For example, the cross-point device 120ij may connect the row line 111i and the column line 113j. The number of the column lines 113a-m and the number of the row lines 111a-n may or may not be the same. In one implementation, each row line 111a-n is a word line and each column line 113a-m is a bit line. In another implementation, each row line 111a-n is a bit line and each column line 113a-m is a word line.

Each cross-point device 120a-z may be and/or include any suitable device with programmable resistance, such as a phase-change memory (PCM) device, a floating gate device, a spintronic device, a ferroelectric device, an RRAM device, etc. Each cross-point device 120a-z may further include one or more transistors and may include an n-transistor-m-resistor (nTmR) configuration, where n and m denote the number of transistors and the number of programmable devices (e.g., RRAM devices) in the cross-point device, respectively. In some embodiments, one or more cross-point devices 120a-z may include a one-transistor-one-resistor (1T1R) configuration described in connection with FIG. 2A and/or FIG. 2B. In some embodiments, one or more cross-point devices 120a-z may be connected to one transistor to implement a 1TmR configuration.

Each row line 111a-n may be connected to one or more row switches 131 (e.g., row switches 131a-n). Each row switch 131 may include any suitable circuit structure that may control current flowing through row lines 111a-n.

Each column line 113a-m may be connected to one or more column switches 133 (e.g., switches 133a, . . . , 133j, . . . , 133m). Each column switch 133a-m may include any suitable circuit structure that may control the current passing through column lines 113a-m. In some embodiments, one or more of switches 131a-n and 133a-m may further provide fault protection, electrostatic discharge (ESD) protection, noise reduction, and/or any other suitable function for one or more portions of crossbar circuit 100.

Crossbar circuit 100 may further include one or more DACs 105 (e.g., DAC 105a, . . . , DAC 105x) that may be selectively connected to row lines 111a-n via row switches 131, or column lines 113a-m via column switches 133. Crossbar circuit 100 may include any suitable number of DACs for implementing various applications. Each DAC 105 may be selectively connected to one or more switches 131a, . . . , 131n. Each DAC 105 may also be selectively connected to one or more switches 133a, . . . , 133m. Each DAC 105 may include any suitable circuitry for converting digital inputs into analog outputs (e.g., voltage signals, current signals), such as a DAC 500 as described in connection with FIG. 5 below. The analog outputs may be provided to one or more enabled cross-point devices 120a-z as programming signals to program the enabled cross-point devices 120a-z to predetermined conductance values and/or to perform in-memory computing operations. For example, DAC 105a may be connected to row line 111i via switch 131i to provide programming signals to cross-point device 120ij. Alternatively or additionally, DAC 105a may be connected to column line 113j via switch 133j to provide programming signals to cross-point device 120ij.

Output sensor(s) 140 may include any suitable component for converting the current flowing through column lines 113a-m into digital outputs, such as one or more TIAs (trans-impedance amplifiers), analog-to-digital converters, etc. In some embodiments, output sensor(s) 140 may further include one or more multiplexers (not shown).

Crossbar circuit 100 may perform parallel weighted voltage multiplication and current summation. For example, an input voltage signal may be applied to one or more rows of crossbar circuit 100 (e.g., one or more selected rows). The input signal may flow through the cross-point devices of the rows of the crossbar circuit 100. The conductance of the cross-point device may be tuned to a specific value (also referred to as a "weight"). By Ohm's law, the input voltage multiplies the cross-point conductance and generates a current from the cross-point device. By Kirchhoff's law, the summation of the current passing through the devices on each column generates the current as the output signal, which may be read from the columns (e.g., outputs of the ADCs). According to Ohm's law and Kirchhoff's current law, the input-output relationship of the crossbar array can be represented as I=VG, wherein I represents the output signal matrix as current; V represents the input signal matrix as voltage; and G represents the conductance matrix of the cross-point devices. As such, the input signal is weighted at each of the cross-point devices by its conductance according to Ohm's law. The weighted current is output via each bit line and may be accumulated according to Kirchhoff's current law. This may enable in-memory computing (IMC) via parallel multiplications and summations performed in the crossbar arrays.

Crossbar circuit 100 may be configured to perform vector-matrix multiplication (VMM). A VMM operation may be represented as Y=XA, wherein each of Y, X, A represents a respective matrix. More particularly, for example, input vector X may be mapped to the input voltage V of crossbar circuit 100. Matrix A may be mapped to conductance values G. The output current I may be read and mapped back to output results Y. In some embodiments, crossbar circuit 100 may be configured to implement a portion of a neural network by performing VMMs.

Figure 2A:
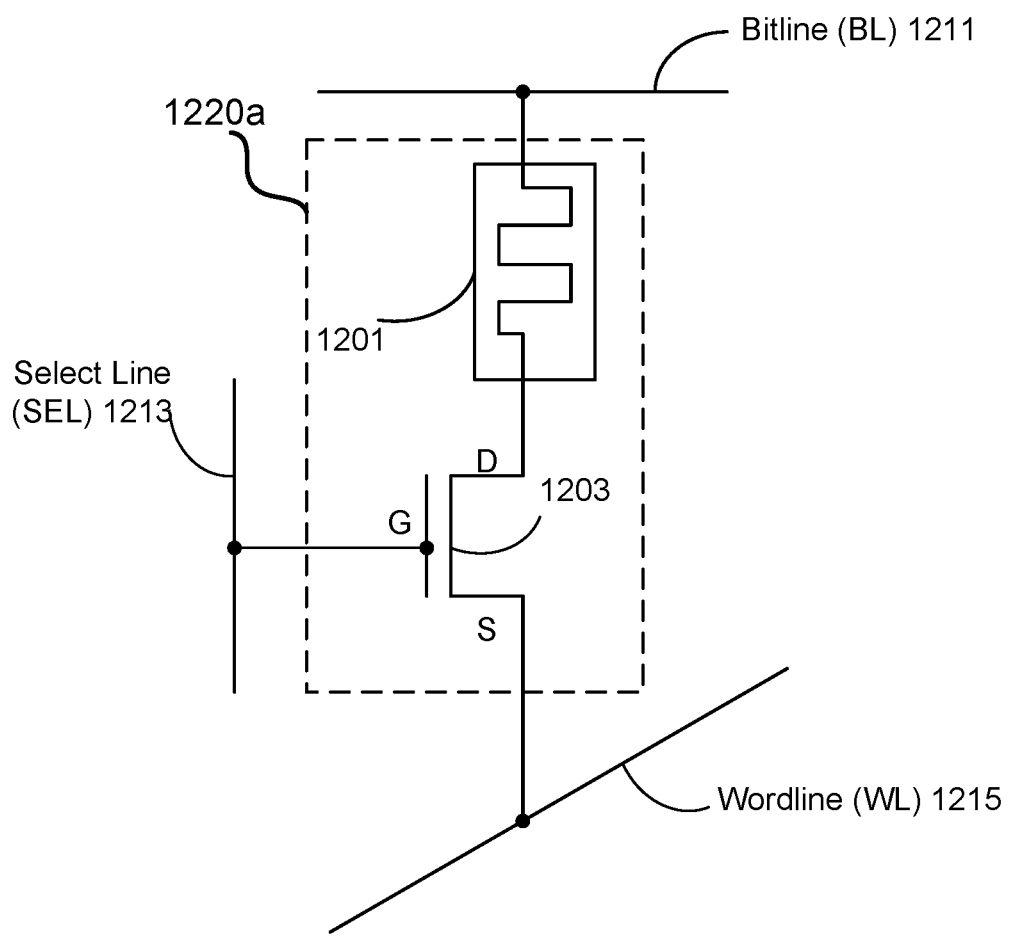
FIGS. 2A and 2B are schematic diagrams illustrating example cross-point devices in accordance with some embodiments of the present disclosure.
Figure 2B:
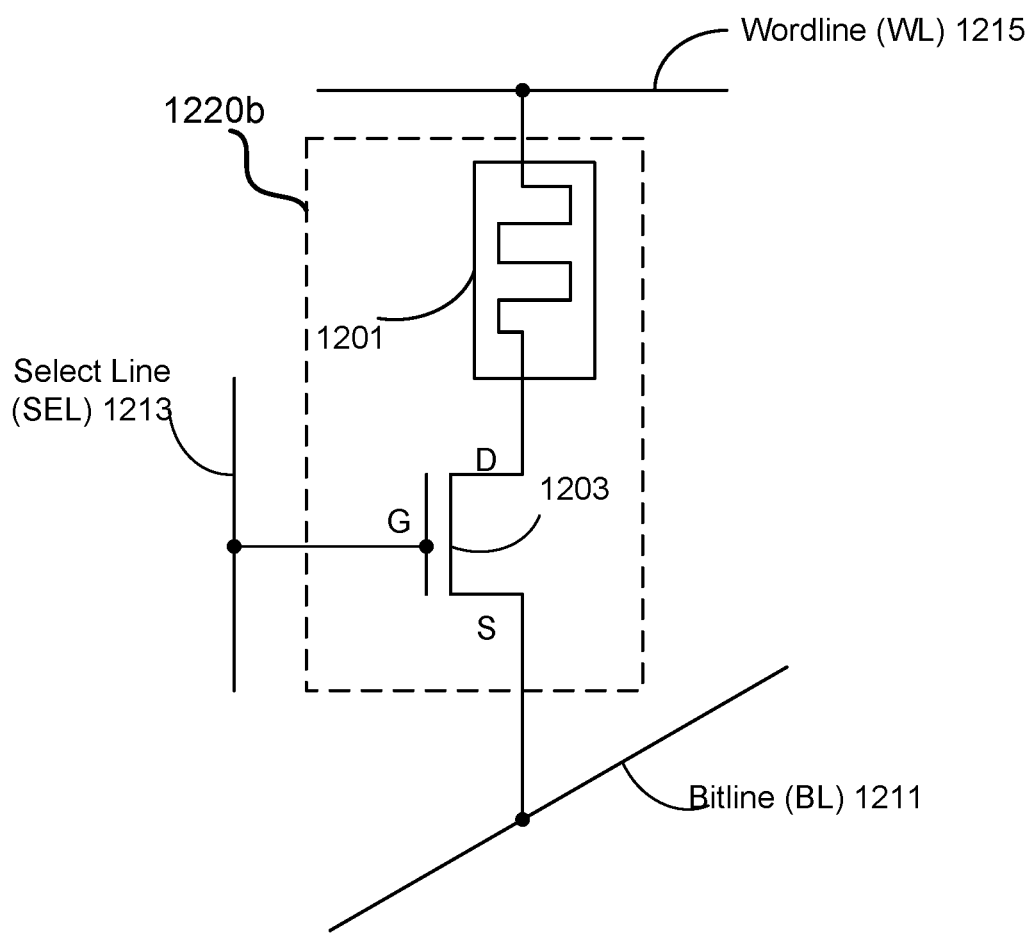

FIGS. 2A and 2B are schematic diagrams illustrating example cross-point devices 1220a and 1220b in accordance with some embodiments of the present disclosure. Cross-point device 1220a and cross-point device 1220b may be referred to as a 1-transistor-1-memristor (1T1R) configuration.

As shown in FIGS. 2A and 2B, each cross-point device 1220a and 1220b may include an RRAM device 1201 and a transistor 1203 that are connected in series. A transistor may include three terminals that may be marked as gate (G), source (S), and drain (D), respectively. Referring to FIG. 2A, the first terminal of RRAM device 1201 may be connected to the drain of transistor 1203. A second terminal of RRAM device 1201 may be connected to a bit line 1211. The source of the transistor 1203 may be connected to a word line 1215. The gate of transistor 1203 may be connected to a select line 1213.

As shown in FIG. 2B, the second terminal of RRAM device 1201 may be connected to the word line 1215, and the source of the transistor 1203 may be connected to a bit line 1211 in some embodiments. Word line 1215 may correspond to a row line 111a-n of FIG. 1. Bit line 1211 may correspond to a column line 113a-m of FIG. 1.

Transistor 1203 may function as a selector as well as a current controller and may set the current compliance to RRAM device 1201 during programming. The gate voltage on transistor 1203 can set current compliances to cross-point device 1220a-b during programming and can thus control the conductance and analog behavior of cross-point device 1220a-b. For example, when cross-point device 1220a-b is set from a high-resistance state to a low-resistance state, a set signal (e.g., a voltage signal, a current signal) may be provided via bit line (BL) 1211 or word line (WL) 1215. Another voltage, also referred to as a select voltage or gate voltage, may be applied via select line (SEL) 1213 to the transistor gate to open the gate and set the current compliance, while word line (WL) 1215 or bit line (BL) 1211 may be grounded. When cross-point device 1220a-b is reset from the low-resistance state to the high-resistance state, a gate voltage may be applied to the gate of transistor 1203 via select line 1213 to open the transistor gate. Meanwhile, a reset signal may be sent to RRAM device 1201 via word line 1215 or bit line 1211, while bit line 1211 or word line 1215 may be grounded.

Figure 3A:
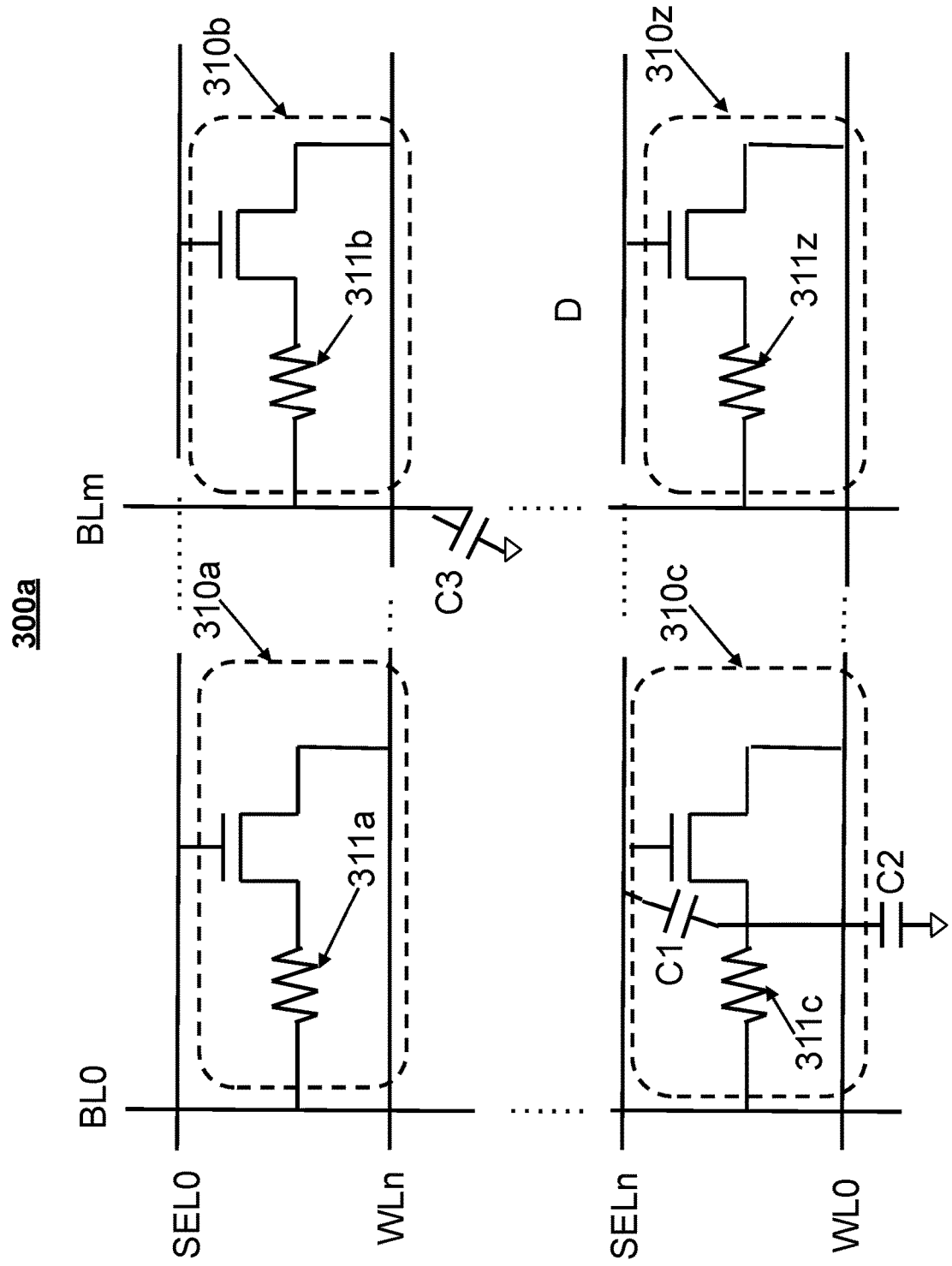
FIGS. 3A and 3B are schematic diagrams illustrating example disturbances that may occur in crossbar circuits.

FIG. 3A is a schematic diagram illustrating example disturbances that may occur in a crossbar circuit 300a. As shown, the crossbar circuit 300a may include cross-point devices 310a, 310b, 310c, . . . , 310z. Each cross-point device 310a, . . . , 310z may be connected to a word line WL0, . . . , WLn, a bit line BL0, . . . , BLm, and a select line SEL0, . . . , SELn. Each cross-point device 310a, 310b, 310c, . . . , 310z may include an RRAM device (e.g., RRAM device 311a, 311b, . . . , 311z). As shown in FIG. 3A, the word lines WL0, . . . , WLn may be parallel to the select lines SEL0, . . . , SELn.

During a form operation or a set operation that programs a cross-point device 310a and/or RRAM device 311a, the word line WLn may be grounded. A programming voltage may be applied to the bit line BL0. A select voltage may be applied to the select line SEL0. The select lines that are not connected to the cross-point device 310a (e.g., SELn) may be grounded. The bit lines and the word lines that are not connected to the cross-point device 310a (e.g., BLm, WL0, etc.) may be set to float. A disturbance may occur during the form operation or the set operation if the voltage across an unselected RRAM device exceeds a predefined amount within a certain time duration. For example, even though the word line WL0 is set to float, the RRAM device 311c may still be charged by BL0, because the RRAM device 311c shares the same bit line with the RRAM device 311a. If the bit line junction capacitance or other parasitic capacitance (e.g., C1 and C2 as shown in FIG. 3A) is large enough, the unselected RRAM device 311c may be unintendedly programmed and thus disturbed by the voltage build-up across it.

Write disturbance may also occur during a deform or reset process if the voltage across an unselected RRAM device exceeds a predefined amount of voltage during a certain time duration. For example, performing a deform operation or reset operation on the cross-point device 310a and/or the RRAM device 311a may involve applying a programming voltage to the word line WLn connected to the cross-point device 310a. The select voltage may be applied to the select line SEL0 to enable the programming of the RRAM device 311a. The bit line BL0 may be grounded. The word lines and the bit lines that are not connected to the cross-point device 310a may be set to float. However, an unselected RRAM device, such as the RRAM device 311b, may still be programmed and/or disturbed. Even though the bit line BLm connected to the unselected RRAM device is set to float, it may still be charged by the programming voltage applied to the word line WLn, because the RRAM devices 311a and 311b share the same word line WLn. If the bit line junction capacitance or other parasitic capacitance (e.g., C3 as shown in FIG. 3A) is large enough, the unselected RRAM device 311b may be unintendedly programmed and thus disturbed by the voltage buildup across it.

Figure 3B:
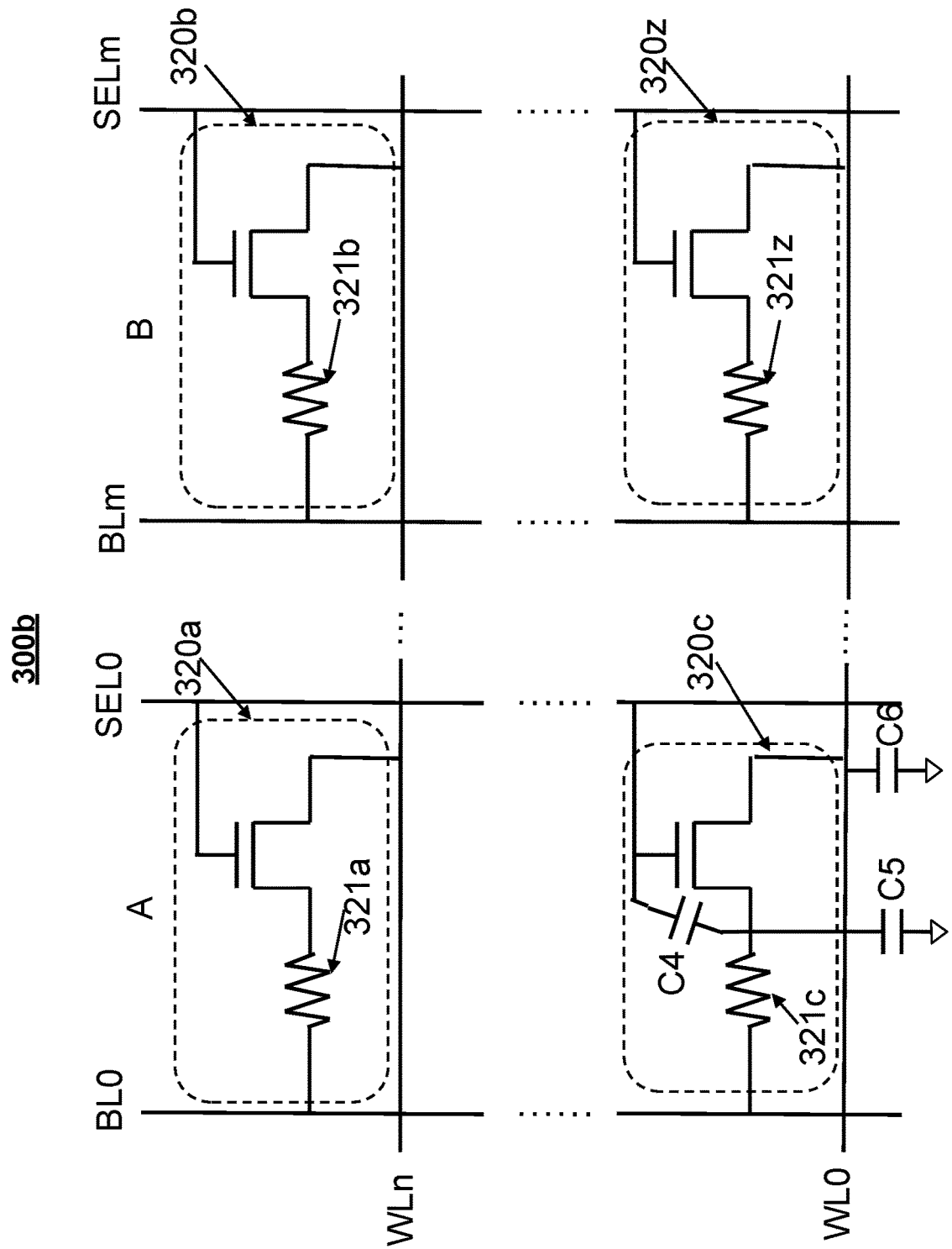

FIG. 3B is a schematic diagram illustrating example disturbances that may occur in a crossbar circuit 300b. As shown, the crossbar circuit 300b may include cross-point devices 320a, 320b, 320c, . . . , 320z. Each of the cross-point devices is connected to a word line WL0, . . . , WLn, a bit lines BL0, . . . , BLm, and a select line SEL0, . . . , SELm. Each cross-point device 320a, 320b, 320c, . . . , 320z may include an RRAM device (e.g., RRAM device 321a, 321b . . . , 321z). As shown in FIG. 3B, the bit lines BL0, . . . , BLm may be parallel to the select lines SEL0, . . . , SELm.

During a form operation or a set operation that programs a cross-point device 320a and/or RRAM device 321a, the word line WLn may be grounded. A programming voltage may be applied to the bit line BL0. A select voltage may be applied to the select line SEL0. The select lines that are not connected to the cross-point device 320a (e.g., SELm) may be grounded. The bit lines and the word lines that are not connected to the cross-point device 320a (e.g., BLm, WL0, etc.) may be set to float. A disturbance may occur during the form operation or the set operation if the voltage across an unselected RRAM device exceeds a predefined amount within a certain time duration. Even though the word line WL0 is set to float, the RRAM device 321c may still be charged by BL0 or SEL0, because the RRAM device 321c shares the same bit line and select line with the RRAM device 321a. If the bit line parasitic capacitor or other parasitic capacitors (e.g., C4, C5, and C6 as shown in FIG. 3B) is large enough, the unselected RRAM device 321c may be unintendedly programmed and thus disturbed by the voltage build-up across it.

A disturbance may also occur during a deform or reset process if the voltage across an unselected RRAM device exceeds a predefined amount of voltage during a certain time duration. For example, performing a deform operation or reset operation on the cross-point device 320a and/or the RRAM device 321a may involve applying a programming voltage to the word line WLn connected to the cross-point device 320a. The select voltage is applied to the select line SEL0 to enable the programming of the RRAM device 321a. The bit line BL0 is grounded. The word lines and the bit lines that are not connected to the cross-point device 320a may be set to float. However, an unselected RRAM device, such as the RRAM device 321c, may still be programmed and/or disturbed, because the RRAM devices 321a and 321c share the same select line SEL0. If the parasitic capacitor is large enough, the unselected RRAM device 321c may be unintendedly programmed and thus disturbed by the voltage buildup across it.

Figure 4A:
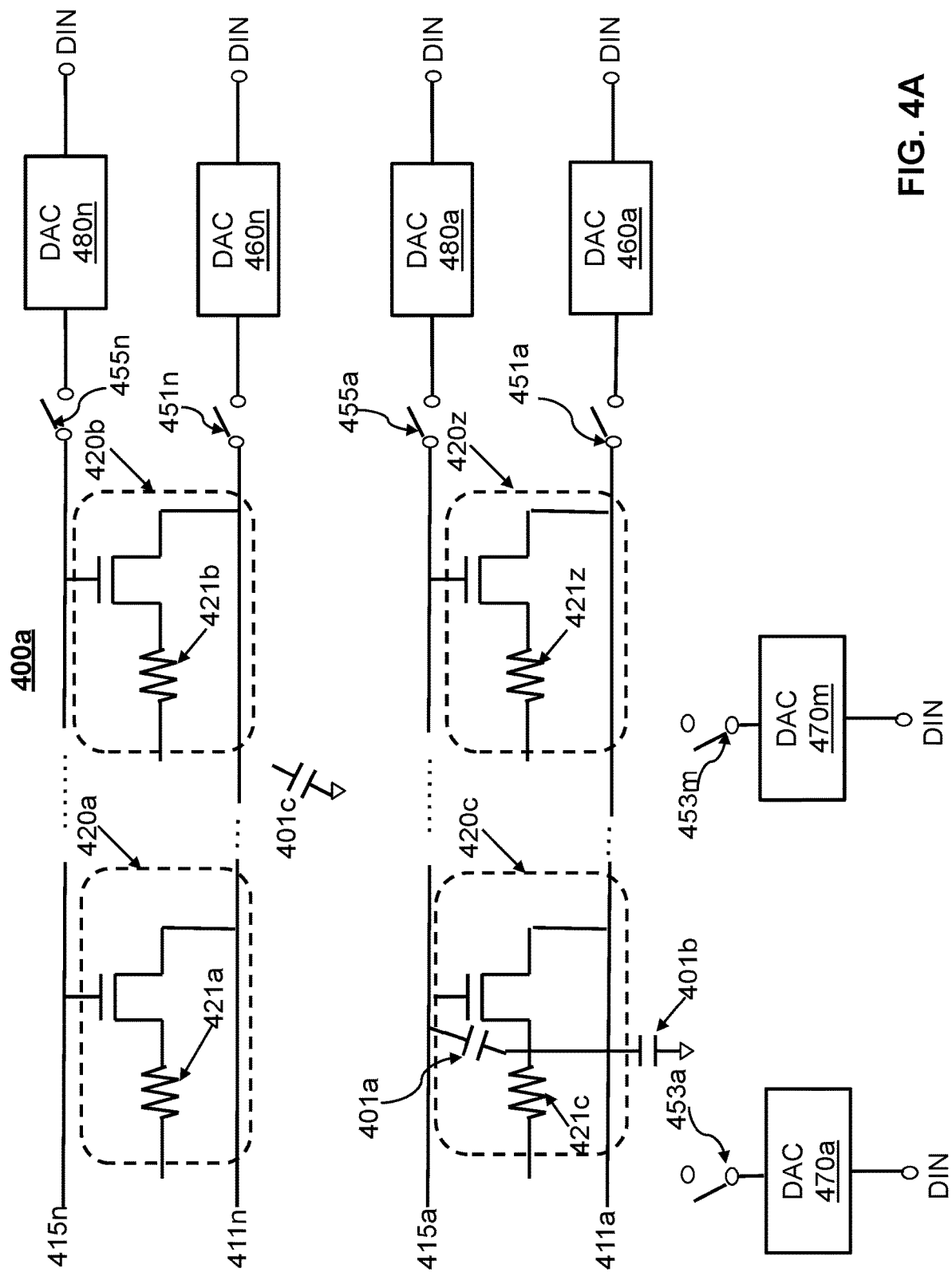
FIGS. 4A and 4B are schematic diagrams illustrating example crossbar circuits in accordance with some embodiments of the present disclosure.
Figure 4B:
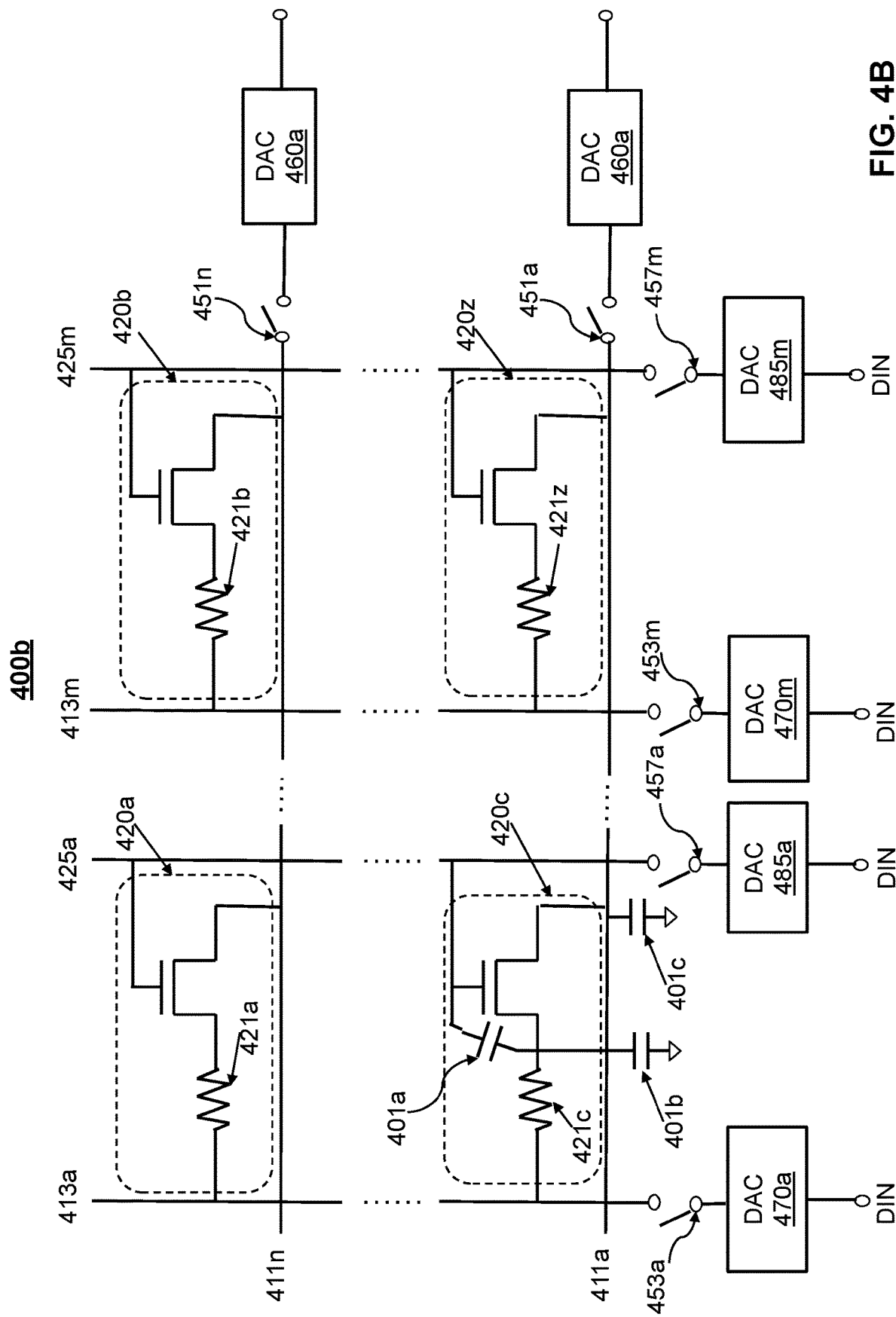

FIGS. 4A and 4B are schematic diagrams illustrating examples 400a and 400b of a crossbar circuit in accordance with some embodiments of the present disclosure. Crossbar circuits 400a and 400b are examples of a portion of crossbar circuit 100 of FIG. 1 in greater detail.

Crossbar circuit 400a and crossbar circuit 400b may include word lines 411a, . . . , 411n, bit lines 413a, . . . , 413m, and cross-point devices 420a, 420b, 420c, . . . , 420z. Word lines 411a-n and bit lines 413a-m may be the same as row lines 111a-n and column lines 113a-m of FIG. 1, respectively. As shown in FIG. 4A, crossbar circuit 400a may further include select lines 415a, . . . , 415n that are parallel to word lines 41a-n. As shown in FIG. 4B, crossbar circuit 400b may further include select lines 425a, . . . , 425m that are parallel to bit lines 413a-m.

As shown in FIGS. 4A-4B, each cross-point device 420a, 420b, . . . , 420z may be connected to a bit line 413a-m, a select line 415a-n, and a word line 41a-n. In some embodiments, each cross-point device 420a, 420b, . . . , 420z may include a transistor and an RRAM device (e.g., RRAM devices 421a, 421b, 421c, . . . , 421z) connected in series (e.g., a 1T1R configuration described in connection with FIG. 2A or FIG. 2B). For example, the RRAM device may be connected to a bit line and the drain or source of the transistor. The gate of the transistor may be connected to a select line 415a-n or 425a-m.

Referring to FIG. 4A, word lines 411a-n may be connected to one or more DACs 460a, . . . , 460n via a switch 451a, . . . , 451n. The bit lines 413a-m may be connected to one or more DACs 470a, . . . , 470m via switches 453a, . . . , 453m. The select lines 415a-415n may be connected to one or more DACs 480a, . . . , 480n via switches 455a, . . . , 455n. Each DAC 460a-460n, 470a-m, and 480a-n may be and/or include a DAC 500 as described in connection with FIG. 5 and may convert a digital input DIN into an analog input. The crossbar circuit 400a may include any suitable number of DACs. In some embodiments, a DAC may be selectively connected to multiple word lines, bit lines, and/or select lines. For example, DAC 460a may be selectively connected to one or more word lines 411a-411n (e.g., via switches 451a-451n). As another example, DAC 470a may be selectively connected to one or more bit lines 413a-m (e.g., via switches 453a-453m).

To program the cross-point device 420a, a select voltage may be applied to the select line 415a to select the cross-point device 420a and/or the RRAM device 421a for programming. The select voltage may be the output of DAC 480n. The select lines that are not connected to the cross-point device 420a (e.g., select line 415a) may be grounded. During a form operation or a set operation, the word line 411n may be grounded. A programming voltage may be applied to the bit line 413a. The programming voltage may be the output of DAC 470a. The bit lines and the word lines that are not connected to the cross-point device 420a (e.g., the bit line 413m, the word line 411a, etc.) may be set to float. During a deform operation or reset operation on the cross-point device 420a and/or the RRAM device 421a, a programming voltage may be applied to the word line 411n connected to the cross-point device 420a. The programming voltage may be the output of DAC 460n. The bit line 413a is grounded. The word lines and the bit lines that are not connected to the cross-point device 420a may be set to float.

Referring to FIG. 4B, the select lines 425a-m may be connected to one or more DACs 485a, . . . , 485m via switches 457a, . . . , 457m. Each DAC 485a-m may be and/or include a DAC 500 as described in connection with FIG. 5 and may convert a digital input DIN into an analog output through pulse width modulation.

To program the cross-point device 420a, a select voltage (e.g., an output of DAC 485a) may be applied to the select line 425a to select the cross-point device 420a and/or the RRAM device 421a for programming. The select lines that are not connected to the cross-point device 420a may be grounded. During a form operation or a set operation, the word line 411n may be grounded. A programming voltage may be applied to the bit line 413a. The programming voltage may be an output of DAC 470a. The bit lines and the word lines that are not connected to the cross-point device 420a (e.g., bit line 413m, word line 411a, etc.) may be set to float. During a deform operation or reset operation on the cross-point device 420a and/or the RRAM device 421a, a programming voltage may be applied to the word line 411n connected to the cross-point device 420*a*. The programming voltage may be an output of DAC 460*a*. The bit line 413*a* is grounded. The word lines and the bit lines that are not connected to the cross-point device 420*a* may be set to float.

As will be described in greater detail below, a DAC as described herein provides a programming voltage or a select voltage by producing an output that ramps up or ramps down over a suitable time period. The ramping up and ramping down of the programming voltage on the selected word line, the selected bit line, or the selected select line may allow the voltage on the parasitic capacitors (e.g., parasitic capacitors 401*a*, 401*b* of FIG. 4A, parasitic capacitors 401*a*, 401*b*, and 401*c* of FIG. 4B) to synchronize with the bit line and word line voltage alterations. As a result, the voltage difference across the unselected cross-point devices may be maintained at a sufficiently low level to prevent unintentional programming of unselected cross-point devices.

Figure 5:
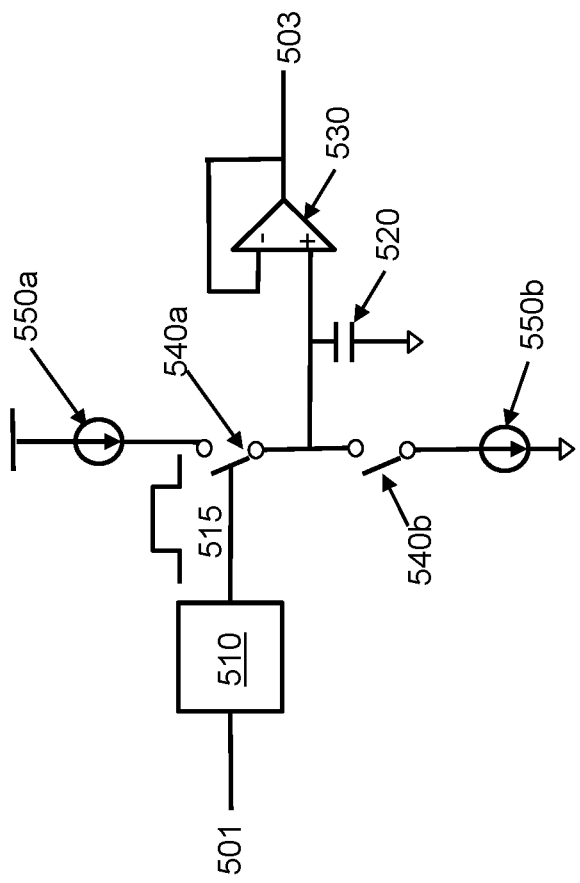
FIG. 5 is a schematic diagram illustrating an example digital-to-analog converter (DAC) for providing programming signals to a crossbar circuit in some embodiments.

FIG. 5 is a schematic diagram illustrating an example digital-to-analog converter (DAC) 500 for providing programming signals to a crossbar circuit in some embodiments.

DAC 500 may receive a digital input 501 and may convert the digital input 501 into an analog output 503 (e.g., a voltage signal). The analog output 503 may be applied to one or more cross-point devices as a programming signal for programming the cross-point devices and/or performing in-memory computing using the cross-point devices. In some embodiments, the analog output 503 may be applied to a word line as a word line voltage and/or to a bit line as a bit line voltage, and/or to a select line as a select line voltage.

As shown, DAC 500 may include a control circuit 510, one or more capacitors 520, and an operational amplifier (op-amp) 530. A first plate and a second plate of the capacitor(s) 520 may be connected to an input (e.g., the positive input) of the op-amp 530 and ground, respectively. The capacitor(s) 520 may be connected to a reference current 550*a* (also referred to as the "first reference current") via a first switch 540*a*. When the first switch 540*a* is on, the reference current 550*a* is connected to the capacitor(s) and the reference current may charge the capacitor(s). When the first switch 540*a* is off and the second switch 540*b* is on, the capacitor(s) 520 may be discharged.

The control circuit 510 may generate, based on the digital input 501, a control signal 515 for controlling the charging rate of the capacitor (s) 520. The control signals 515 may control the on and/or off durations of the first switch 540*a* and may thus control the charging of the capacitor(s) 520. In some embodiments, the control circuit 510 may include and/or be a pulse width modulation (PWM) circuit that may convert the digital input 501 into a pulse-width modulated signal. In such embodiments, the control signal 515 is the pulse-width modulated signal generated based on the digital input. The first switch 540*a* may be turned on or off based on the duty cycle of the pulse-width modulated signal. For example, the first switch 540*a* may be turned on when the pulse-width modulated signal is in a high state. The first switch 540*a* may be turned off when the pulse-width modulated signal is in a low state. The capacitor(s) 520 may then be charged to a desired voltage corresponding to a programming voltage to be applied to a selected cross-point device. The programming voltage may be a word line voltage to be applied to a word line connected to the selected cross-point device and/or a bit line voltage to be applied to a bit line connected to the selected cross-point device, and/or a select line voltage to be applied to a select line connected to the selected cross-point device.

The capacitor(s) 520 may be discharged after the generation of the bit line voltage, the word line voltage, or the select line voltage. After the programming cycle is completed, the bit line voltage or the word line voltage, or the select line voltage may be slowly ramped down by discharging the capacitor(s) 520 (by connecting the first plate of the capacitor(s) 520 to ground through another reference current 550*b* (also referred to as the "second reference current")).

As the programming signal is generated by charging the capacitor(s) 520 over a period of time, the reference voltage provided to the op-amp and the output of the op-amp is ramped up during the period of time. As such, the output of the DAC 500 is not a step signal and will not result in a disrupted voltage change that may cause write disturbance. Similarly, the discharging of the capacitor(s) 520 after the programming of the selected cross-point device may slow down the voltage changes on the bit line, the word line, and the select line connected to the selected cross-point device.

Figure 6:
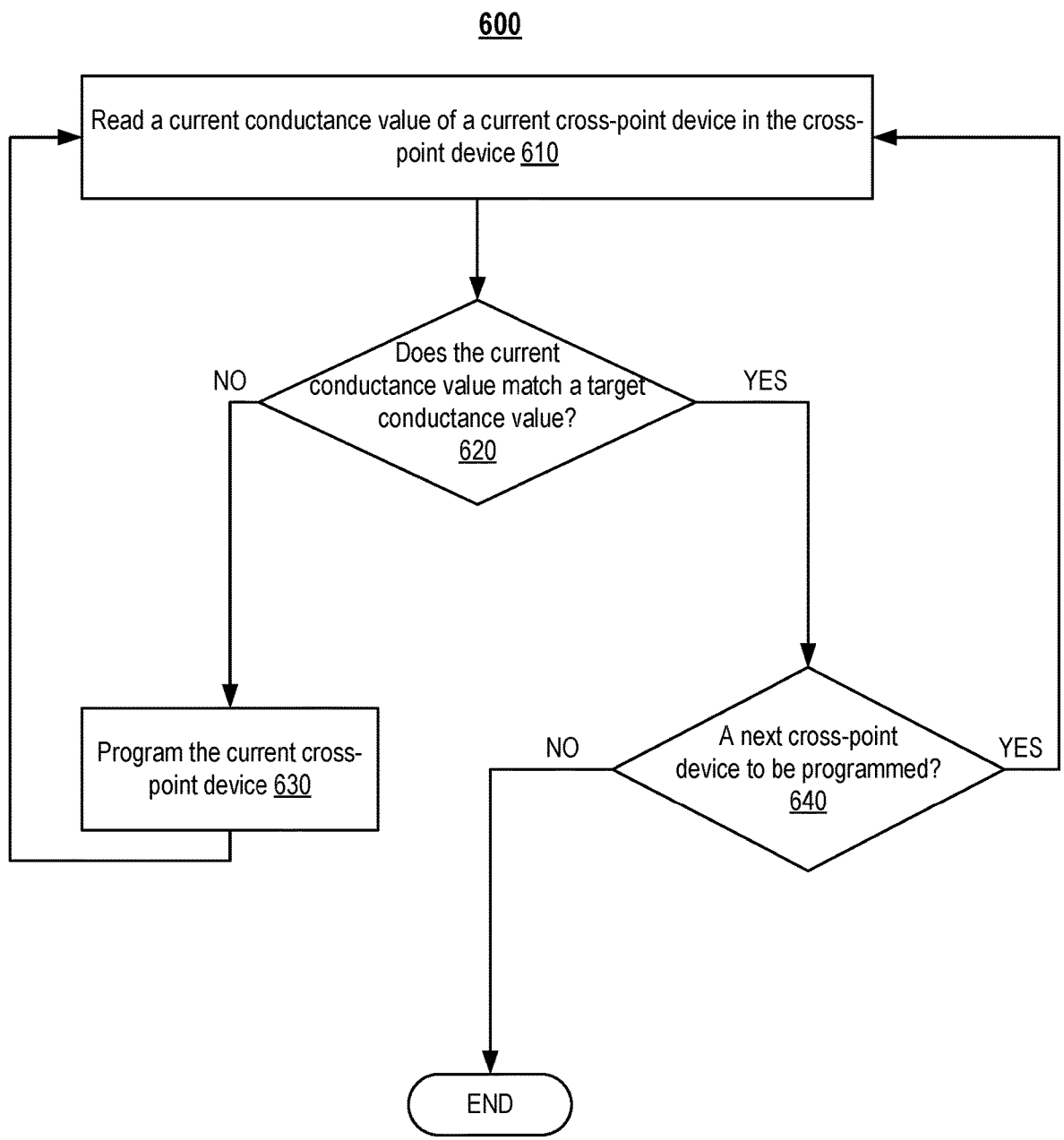
FIG. 6 is a flowchart of an example method for programming a crossbar circuit in accordance with some embodiments of the present disclosure.

FIG. 6 is a flowchart of an example method 600 for programming a crossbar circuit in accordance with some embodiments of the present disclosure. The crossbar circuit may include a plurality of intersecting wires, such as a plurality of bit lines, a plurality of word lines, and a plurality of select lines. The crossbar circuit may further include a plurality of cross-point devices. Each of the cross-point devices is connected to at least one of the word lines, at least one of the bit lines, and at least one of the select lines. The crossbar circuit may be the crossbar circuit 400*a-b* of FIGS. 4A-4B.

At 610, a current conductance value of a current cross-point device in the crossbar circuit may be read using suitable circuitry.

At 620, the current conductance value may be compared to a target conductance value to determine if the current conductance value matches the target conductance value. The current conductance value may be regarded as matching the target conductance value when a difference between the current conductance value and the target conductance value is not greater than a predetermined threshold.

In some embodiments in which the current conductance value does not match the target conductance value ("NO" at 620), the current cross-point device may be programmed based on the comparison result at 630. For example, in some embodiments in which the current conductance value is higher than the target conductance value, a reset operation may be performed on the current cross-point device. As another example, in some embodiments in which the current conductance value is lower than the target conductance value, a set operation may be performed on the current cross-point device. Programming the current cross-point device may involve performing one or more operations as described in FIG. 7 below. Method 600 may loop back to 610 after executing 630. The programming of the current cross-point device may be performed by executing 610, 620, and 630 iteratively until the current conductance value of the current cross-point device matches the target conductance value.

In some embodiments in which the current conductance value matches the target conductance value, method 600 may proceed to 640 and may determine if a next cross-point device of the crossbar circuit is to be programmed. If one or more cross-point devices in the crossbar circuit are to be programmed, the next cross-point device may be selected for programming until the conductance of each of the cross-point devices to be programmed reaches its corresponding target value. If the conductance of each of the cross-point devices to be programmed reaches its respective target value, method 600 may conclude.

Figure 7:
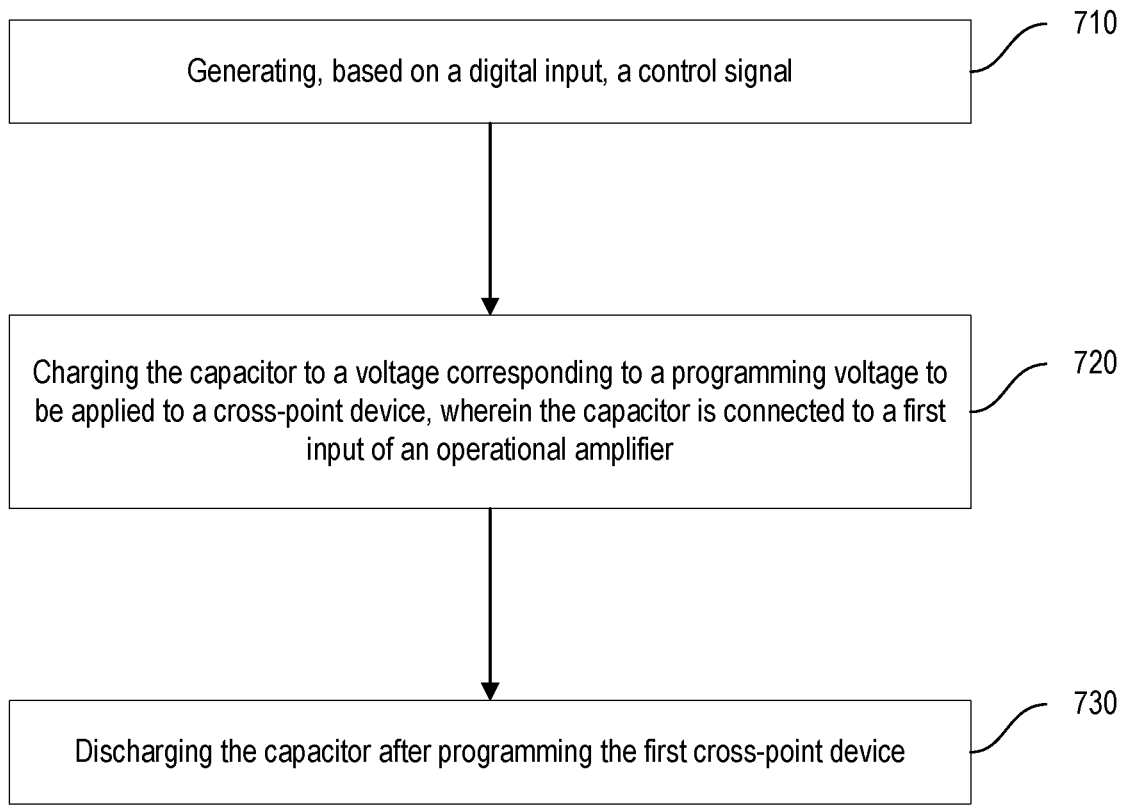
FIG. 7 is a flowchart of an example method for programming a cross-point device of a crossbar circuit in accordance with some embodiments of the present disclosure.

FIG. 7 is a flowchart of an example method 700 for programming a crossbar circuit in accordance with some embodiments of the present disclosure. The crossbar circuit may include a plurality of bit lines intersecting with a plurality of word lines and a plurality of cross-point devices. Each of the plurality of cross-point devices is connected to at least one of the word lines and at least one of the bit lines. The crossbar circuit may be the crossbar circuit 100 of FIG. 1 and/or the crossbar circuits 400*a-b* of FIGS. 4A-4B. Method 700 may be performed to program a first cross-point device of the crossbar circuit to a target conductance value without disturbing another cross-point device of the crossbar circuit that is not selected for programming. The first cross-point device (e.g., cross-point device 420*a* of FIGS. 4A-4B) may include a first RRAM device (e.g., RRAM device 421*a* of FIGS. 4A-4B). The first cross-point device may be connected to a first bit line, a first word line, and a first select line of the crossbar circuit.

At 710, a control circuit may generate a control signal based on a digital input. For example, the control circuit may convert the digital input into a pulse-width modulated signal. The control circuit may be, for example, the control circuit 510 of FIG. 5.

At 720, a capacitor may be charged to a voltage corresponding to a programming voltage to be applied to the first cross-point device. The capacitor (e.g., the capacitor 520 of FIG. 5) is connected to an input (e.g., the positive input) of an operational amplifier (e.g., the op-amp 530 of FIG. 5). The output of the operational amplifier may be connected to the first word line, the first bit line, and/or the first select line. The charging of the capacitor is controlled by the control signal generated by the control circuit. Charging the capacitor may involve connecting the capacitor to a first reference current. For example, the first plate of the capacitor may be connected to the first reference current via a first switch (e.g., switch 540*a* of FIG. 5). The first switch may be on when the control signal is in a high state and may be off when the control signal is in a low state.

At 730, the capacitor may be discharged after the programming of the first cross-point device. For example, the first plate of the capacitor may be connected to ground via a second switch (e.g., the second switch 540*b* of FIG. 5) and a second reference current.

The terms "approximately," "about," and "substantially" as used herein may mean within a range of normal tolerance in the art, such as within 2 standard deviations of the mean, within ±20% of a target dimension in some embodiments, within ±10% of a target dimension in some embodiments, within ±5% of a target dimension in some embodiments, within ±2% of a target dimension in some embodiments, within ±1% of a target dimension in some embodiments, and yet within ±0.1% of a target dimension in some embodiments. The terms "approximately" and "about" may include the target dimension. Unless specifically stated or obvious from context, all numerical values described herein are modified by the term "about."

As used herein, a range includes all the values within the range. For example, a range of 1 to 10 may include any number, combination of numbers, sub-range from the numbers of 1, 2, 3, 4, 5, 6, 7, 8, 9, and 10 and fractions thereof.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

The terms "first," "second," "third," "fourth," etc. as used herein are meant as labels to distinguish among different elements and may not necessarily have an ordinal meaning according to their numerical designation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

As used herein, when an element or layer is referred to as being "on" another element or layer, the element or layer may be directly on the other element or layer, or intervening elements or layers may be present. In contrast, when an element or layer is referred to as being "directly on" another element or layer, there are no intervening elements or layers present.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. An apparatus, comprising:
a plurality of bit lines intersecting with a plurality of word lines;
a plurality of cross-point devices, wherein each of the plurality of cross-point devices is connected to at least one of the plurality of word lines and at least one of the plurality of bit lines;
a capacitor configured to be connected to a reference current via a first switch; and
an operational amplifier, wherein a first input of the operational amplifier is connected to the capacitor, and wherein an output of the operational amplifier is operatively connected to one or more of the word lines or bit lines via one or more switches.

2. The apparatus of claim 1, further comprising a control circuit configured to generate a control signal based on a digital input, wherein the first switch is switched on or off based on the control signal.

3. The apparatus of claim 2, wherein the control signal comprises a pulse-width modulated signal generated based on the digital input.

4. The apparatus of claim 1, wherein the capacitor is configured to be discharged via a second switch.

5. The apparatus of claim 1, wherein the plurality of cross-point devices comprises at least one of a memristor, a phase-change memory (PCM) device, a floating gate device, a spintronic device, a ferroelectric device, or a resistive random-access memory (RRAM) device.

6. The apparatus of claim 1, wherein the operational amplifier comprises a unity gain amplifier.

7. The apparatus of claim 1, wherein a second input of the operational amplifier is grounded.

8. The apparatus of claim 1, wherein the apparatus further comprises a plurality of select lines.

9. The apparatus of claim 8, wherein the plurality of select lines are parallel to the plurality of bit lines.

10. The apparatus of claim 8, wherein the plurality of select lines are parallel to the plurality of word lines.

11. The apparatus of claim 1, wherein a second input of the operational amplifier is connected to the output of the operational amplifier.

12. A method for programming a crossbar circuit, the method comprising:
generating, based on a digital input, a control signal; and
charging a capacitor to a voltage corresponding to a programming voltage to be applied to a first cross-point device of the crossbar circuit, wherein the crossbar circuit comprises a plurality of word lines intersecting with a plurality of bit lines and a plurality of cross-point devices, wherein the capacitor is connected to a first input of an operational amplifier, wherein an output of the operational amplifier is connected to at least one of a first word line or a first bit line, or a first select line connected to the first cross-point device, and wherein the charging of the capacitor is controlled by the control signal.

13. The method of claim 12, wherein the control signal comprises a pulse-width modulated signal.

14. The method of claim 12, wherein charging the capacitor comprises connecting a first plate of the capacitor to a first reference current via a first switch, wherein the first plate of the capacitor is connected to the first input of the operational amplifier.

15. The method of claim 14, wherein the first switch is switched on or off based on the control signal.

16. The method of claim 15, wherein discharging the capacitor after programming the first cross-point device comprises grounding the first plate of the capacitor via a second switch.

17. The method of claim 16, wherein the first plate of the capacitor is connected to a second reference current.

18. The method of claim 12, wherein the plurality of cross-point devices comprises at least one of a memristor, a phase-change memory (PCM) device, a floating gate device, a spintronic device, a ferroelectric device, or a resistive random-access memory (RRAM) device.

19. The method of claim 12, wherein a second input of the operational amplifier is connected to the output of the operational amplifier.

* * * * *